United States Patent
Heino et al.

(10) Patent No.: US 7,794,670 B2
(45) Date of Patent: Sep. 14, 2010

(54) METHOD AND APPARATUS FOR PRODUCING POLYMERS

(75) Inventors: Timo Heino, Porvoo (FI); Sami Karvinen, Vantaa (FI)

(73) Assignee: Borealis Technology Oy, Provoo (FI)

( * ) Notice: Subject to any disclaimer, the term of this patent is extended or adjusted under 35 U.S.C. 154(b) by 107 days.

(21) Appl. No.: 10/591,436

(22) PCT Filed: Mar. 15, 2005

(86) PCT No.: PCT/FI2005/000153

§ 371 (c)(1),
(2), (4) Date: Sep. 1, 2006

(87) PCT Pub. No.: WO2005/087361

PCT Pub. Date: Sep. 22, 2005

(65) Prior Publication Data

US 2007/0217966 A1 Sep. 20, 2007

(30) Foreign Application Priority Data

Mar. 15, 2004 (EP) .................................. 04396018

(51) Int. Cl.
*F27B 15/00* (2006.01)
*C08F 2/00* (2006.01)
*B01J 19/00* (2006.01)

(52) U.S. Cl. ........................... 422/143; 422/131; 526/64

(58) Field of Classification Search .................. 422/143, 422/131; 526/64

See application file for complete search history.

(56) References Cited

U.S. PATENT DOCUMENTS

| 4,578,879 | A | * | 4/1986 | Yokoyama et al. ............. 34/582 |
| 4,933,149 | A | * | 6/1990 | Rhee et al. ................... 422/131 |
| 5,627,243 | A | * | 5/1997 | H am al ainen et al. ........ 526/68 |
| 5,753,191 | A | * | 5/1998 | Yamamoto et al. ........... 422/143 |
| 5,837,208 | A | * | 11/1998 | Grott et al. ................... 422/195 |
| 6,117,399 | A | | 9/2000 | Jorgensen et al. |
| 6,838,532 | B2 | * | 1/2005 | Veariel et al. ................. 526/82 |
| 2003/0220461 | A1 | * | 11/2003 | Ohtani et al. ................ 526/348 |

FOREIGN PATENT DOCUMENTS

| EP | 0 088 638 A2 | 9/1983 |
| EP | 0 721 798 A2 | 7/1996 |
| GB | 1 014 205 A | 12/1965 |

* cited by examiner

*Primary Examiner*—Walter D Griffin
*Assistant Examiner*—Natasha Young
(74) *Attorney, Agent, or Firm*—Birch, Stewart, Kolasch & Birch, LLP

(57) ABSTRACT

Method and apparatus of producing polymers in a gas phase polymerization reactor, which has an elongated reactor body, and an essentially vertically disposed central axis. The reactor comprises an upper part and a lower part, which are separated by a distribution plate, which promotes distribution into the fluidized bed of monomers flowing from the lower part into the upper part. According to the invention, at least a part of the gas stream fed into the lower part of the reactor is conducted along the inside of the reactor walls past the distribution plate to prevent the formation of stagnant zones in the fluidized bed at the reactor walls in the vicinity of the distribution plate.

16 Claims, 5 Drawing Sheets

METHOD AND APPARATUS FOR PRODUCING POLYMERS

BACKGROUND OF THE INVENTION

1. Field of the Invention

The present invention relates to the production of polymers in gas phase reactors. In particular, the present invention concerns a method and apparatus for producing olefin polymers in gas phase reactors substantially in the absence of chunks and sheets.

2. Description of Related Art

Gas phase polymerization reactors generally comprise an elongated reactor body having an essentially vertically disposed central axis. The reactor is divided into two distinct parts, viz. an upper part and a lower part, which are separated by a distribution plate. Polymerization takes place in the upper part of the reactor body, in a fluidized bed formed by catalyst particles. The lower part is a mixing zone. Thus, one or several monomers or a gas containing the monomer(s) are fed into the reactor through an inlet placed in the lower part of the reactor by using a compressor or blower. The inlet comprises, for example, feed nozzles, which are usually provided with deflector means for achieving intensive mixing of the feed gas within the lower part of the reactor. From this mixing zone, the gas flow is conducted through the distribution plate, which aids in uniformly distributing the monomers into the fluidized catalyst bed above the distribution plate. The distribution plate comprises a plurality of openings, which conventionally are covered with (over)caps to provide sideward directed flow of the gas. The monomers are polymerized on the catalyst particles, ideally forming particulate polymer granules.

Unreacted monomers or monomer-containing gas are withdrawn from the reactor through an outlet located in the upper part of the reactor, above the surface of the fluidized bed. The unreacted gas is usually cooled and recycled to the reactor inlet. Polymer particles are separately withdrawn from the reactor and subjected to further treatment, e.g. to a second polymerization step for producing homo- or copolymers or to degasification and pelletizing to produce homo- or copolymer pellets.

In conventional gas phase reactors of the above kind, there is one single distribution plate inside the reactor body. The fluidized bed is formed above the distribution plate and does not extent below it. The plate separating the upper and the lower parts will retain a significant part of the polymer particles in case of a shutdown.

Chunk and sheet formation is a problem in conventional gas phase reactors. The chunks and sheets tend to make the flow of monomer gas through the fluidized bed less homogeneous giving rise to pressure drop and clogging. They may even plug the outlet. Eventually, they will have to be removed from the reactor, which impairs productivity.

Chunks and sheet are usually formed in stagnant zones within the reactor. For example, chunk formation has also been observed at the overcaps above the openings of the gas distribution plate. In the art, certain improvements of the construction of the gas distribution plates have been proposed.

EP-A-963 786 discloses a gas distribution plate having no caps over the openings. The openings are straight passages, with a conical outlet at the upper part of the plate.

GB-A-2 271 727 discloses a gas distribution plate having a specific arrangement of openings. The openings are arranged at the vertices of the random squares adjoining to one another on the plate, and also at positions close to the sidewall of the reactor. The openings are covered with caps.

EP-A-721 798 discloses a gas distribution plate where the openings at the outer peripheral part of the plate have larger diameter that the openings at the inner peripheral part. The openings are preferably provided with caps.

Although the above distribution plate constructions represent, generally speaking, an improvement of the distribution of the gas within the fluidized bed, experience shows that chunks and sheets are still formed in gas phase reactors even if they are provided with the above-described distribution plates.

GB-A-1 014 205 describes a fluidisation reactor of a different kind than the one identified above in the introduction, namely a reactor having a plurality of gas distributor plates located at different levels inside the reactor body. The openings in the gas distributor plates are first constricted in the direction of gas flow and then widened so that the total area of the openings at the narrowest points is equal to 30 to 70% of the total cross-sectional area of the fluidization reactor. The openings are e.g. formed by concentric apertures having an annular shape.

Since there are several distributor plates inside the reactor, flow conditions will be significantly different from those in a reactor of the present kind. The construction shown in GB 1 014 205 is quite complicated, as it consists of separate rings, which need to be supported over the whole diameter of the reactor.

SUMMARY OF THE INVENTION

It is an object of the present invention to reduce or eliminate the above problems and to provide a new method of polymerizing monomers in a gas phase polymerization reactor.

It is another object of the invention to provide an apparatus for producing polymers in a gas phase polymerization reactor.

These and other objects, together with the advantages thereof over known methods and apparatuses, are achieved by the present invention, as hereinafter described and claimed.

The invention is based on the finding that there are some regions in the upper part of the reactor, which are particularly susceptible to the formation of sheets or chunks. Such areas are located primarily close to or on the inner walls of the reactor, in particular in the region immediately above the distribution plate.

According to the present invention it has been found that stagnant zones are formed above the distribution plate, next to the inner wall of the reactor. In those zones, the gas flow will become slow and this would seem to cause some of the polymer particles to stop at the wall. When the particles contain active catalyst, they continue to grow at the wall. Other particles may adhere to this subsequently leading to a formation of sheets and chunks.

The present invention solves the problem by arranging a free flow path for the gas at the wall of the gas phase reactor. According to the invention it is essential to have a gas flow along the inside of the reactor wall in the area where the distribution plate normally adjoins the wall. This aim can be suitably achieved by arranging a gap between the reactor wall and the edge of the gas distribution plate along most of the periphery of the plate. None of the references discussed above suggests such a gap between the reactor wall and the gas distribution plate. Merely by providing, e.g., larger openings or a larger number of openings at the peripheral part of the distribution plate, the above-discussed problem cannot be overcome.

Thus, the present invention provides a method of producing polymers in a gas phase polymerization reactor having an elongated reactor body, defined by reactor walls, and an essentially vertically disposed central axis, the reactor comprising an upper part, in which a reactor bed of fluidized catalyst particles can be formed, and a lower part, in which monomer gas can be introduced, said upper and said lower parts being separated by a distribution plate, which also promotes distribution into the fluidized bed of monomers flowing from the lower part into the upper part. A gas stream containing monomer(s) is fed into the lower part of the reactor, the monomer(s) is (are) polymerized on the catalyst particles to form a polymer, unreacted monomers are withdrawn, and the polymer is recovered and, optionally, subjected to further treatment. The distribution plate employed in the present invention is of the kind, which effectively separates the fluidized bed formed in the upper part of the reaction from the lower part of the reactor.

According to the invention, at least a part of the gas stream fed into the lower part of the reactor is conducted along the inside of the reactor walls past the distribution plate to prevent the formation of stagnant zones in the fluidized bed which otherwise typically are formed at the reactor walls in the vicinity of the distribution plate. The part of the gas stream conducted along the inside preferably forms an essential part, typically at least 20%, in particular at least 30%, of the total flow of gas through the plate.

More specifically, the method according to the invention is characterized by what is stated in the characterizing part of claim 1.

The apparatus according to the invention is characterized by what is stated in the characterizing part of claim 11.

Considerable advantages are obtained by the present invention. Thus, the apparatus and method reduce or even eliminate the formation of stagnant zones and, thus, essentially prevent the formation of chunks in the reactor, which normally causes operational disturbance and possibly shutdown. The construction is simple and reliable and readily implemented even on existing equipment.

A distribution plate according to the present invention is easily installed. It can be produced as an integral structure (in one piece) or it can be assembled from two or more pieces on the spot.

Next the invention will be described more closely with the aid of a detailed description and with reference to the appended drawings.

DETAILED DESCRIPTION OF THE INVENTION

As discussed above, the present invention provides an improved construction of a gas phase reactor suitable for polyolefin production.

According to the invention, monomer-containing gas or other gas is conducted along the inside of the reactor walls past the distribution plate to prevent the formation of stagnant zones in the fluidized bed at the reactor walls in the vicinity of the distribution plate. It is preferred to have a gas stream conducted along at least 50%, preferably at least 80% of the periphery of the inside of the reactor wall enclosing the distribution plate. In particular, the gas stream is conducted along 90-100%, or 90 to 95%, of the periphery of the inside of the reactor wall enclosing the distribution plate According to a preferred embodiment, the gas stream is conducted along the periphery of the inside of the reactor wall through an essentially annular opening formed between the distribution plate and the reactor wall. Such an annular opening has a width of 0.1 to 50 mm, typically about 0.5 to 20 mm, preferably at least 1 mm, and in particular about 1 to 10 mm, e.g. about 2 to 10 mm.

The throttling or restricting of the free flow path between the distribution plate and the wall of the reactor may increase the flow rate of a gas stream conducted along the inside of the reactor wall. The flow rate of the gas stream can amount to something on the order of about 1 to 200 cm/s, preferably 10 to 100 cm/s, in particular 30 to 70 cm/s.

The gas distribution plate has generally round openings (i.e. the openings or apertures have a generally circular cross-section) through which the gas can pass from the mixing zone into the fluidized bed. The openings are arranged in the gas distribution plate to provide the desired flow profile in the fluidised bed. The openings have a "generally circular shape" means that they are either circular or slightly oval, with a deviation from the circular shape of only about 20% or less, preferably less than about 10%. The diameter ranges from about 5 to about 25 mm, preferably from 6 to 20 mm and in particular from 8 to 15 mm. The flow rate of the gas within the opening is at least two times the fluidization velocity for the powder contained in the fluidized bed, preferably at least three times, and in particular at least four times, the fluidization velocity.

Figure 2:
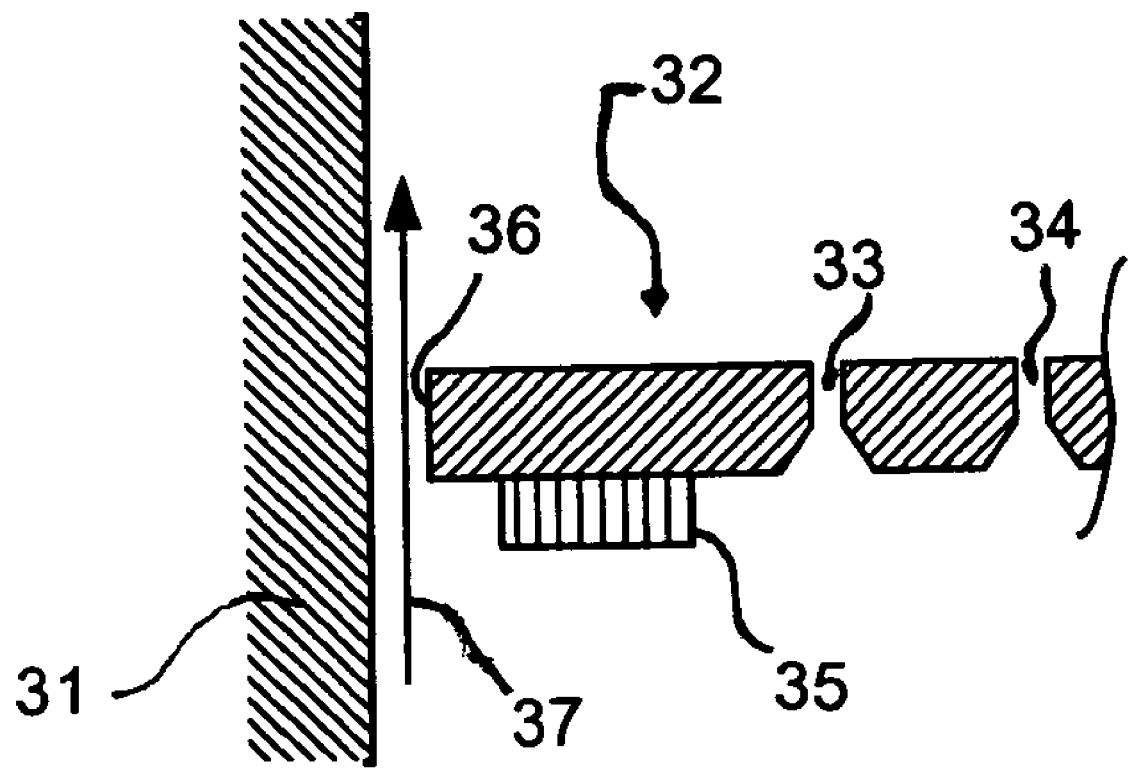
FIG. 2 depicts in a schematic fashion a cross-section of such a polymerization reactor, in which a part of the wall of a gas phase reactor and of the a distribution plate arrangement according to the present invention is shown.

Preferably the gas distribution plate is planar and is horizontally installed within the reactor. In order to achieve good gas distribution, it is generally required that there is a significant pressure drop over the gas distribution plate. Such a pressure drop can amount to about 0.2 bar at the most, preferably it is about 0.01 to 0.15 bar. To increase pressure drop, the openings have a generally cylindrical shape, although their inlet portion may be conical, as shown in FIG. 2.

According to a first embodiment of the invention, the sealing between the gas distribution plate and the reactor wall is removed. This results in a gas flow along the wall that was sufficiently strong to carry away particles that otherwise would have adhered at the wall. The removal of the sealing is the easiest, but not the only, way to obtain a gas flow at the wall. Other constructions of the distribution plate are also possible. Thus, the rim or edge of the distribution plate can be provided with a plurality of transversal recesses or openings, which extend inwards from the periphery of the edge. Thus, open gas conduits are formed at the inner walls between the lower part of the reactor and the upper part. It is also possible to replace a conventional distribution plate having a circular periphery with a polygonal plate, having a minimum of 8, preferably at least 12, in particular at least 24, suitably at least 32 sides. Between the straight sides and the convex reactor wall facing the sides, there is formed a suitable opening for gas flow along the reactor wall.

According to a second preferred embodiment of the invention, the openings of the gas distribution plate are not covered by overcaps. This avoids the formation of dead zones immediately above the plate. This construction further reduces chunk formation. Further, the removal of the overcaps has the result that the holes below the overcap are not so easily plugged.

Basically, a distribution plate without overcaps is known in the art, e.g. it is disclosed in EP 963786. However, the reference does not disclose that a gap is simultaneously provided between the reactor wall and the gas distribution plate.

Figure 1:
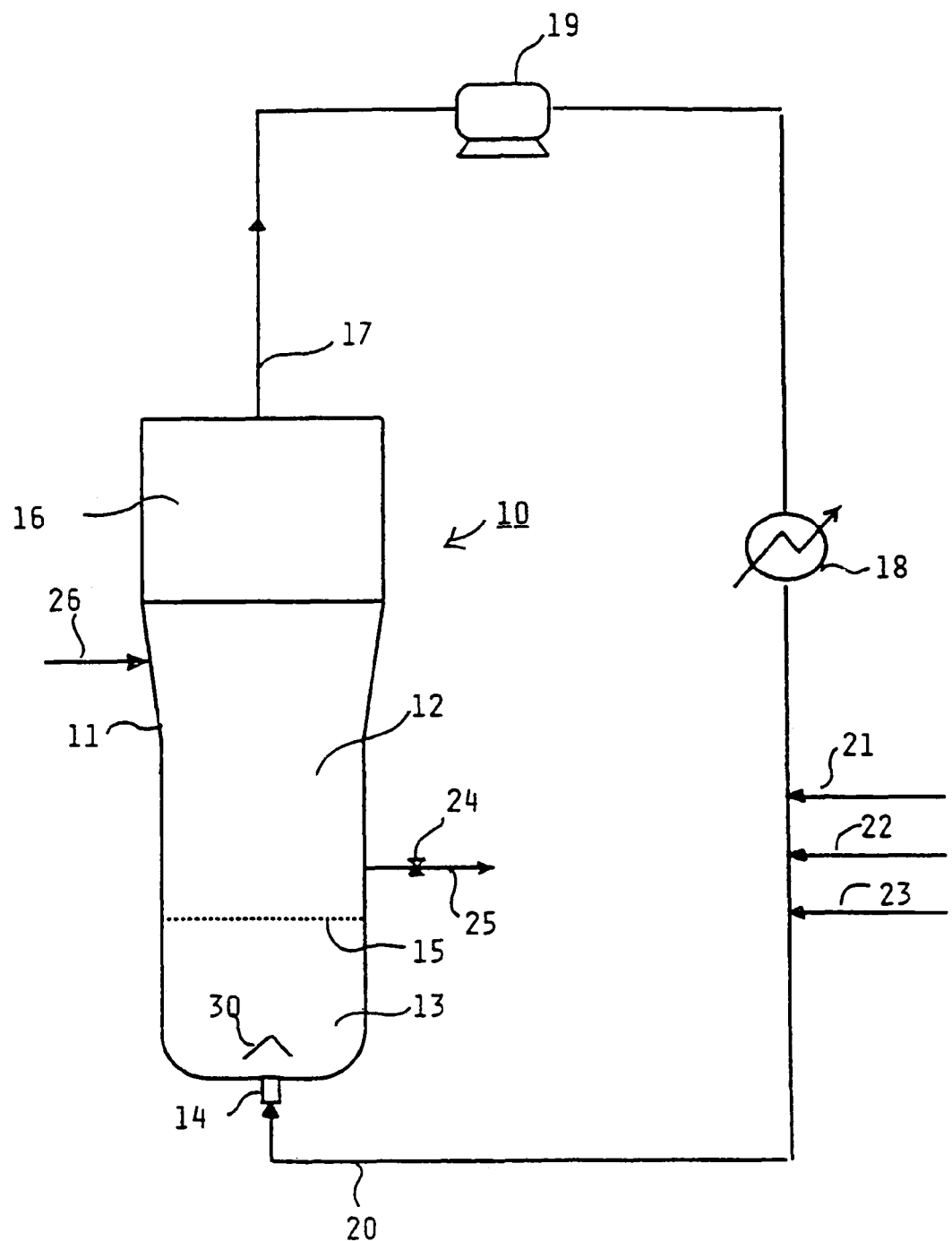
FIG. 1 shows in side view the construction of a gas phase reactor.

Turning now to the working embodiments depicted in the drawings, it can be noted that FIG. 1 shows a gas phase reactor 10, in which the upper section 11 forms a polymerization space 12 in which olefin monomers are polymerized in a fluidized bed containing polymerizing particles in the presence of an olefin polymerizing catalyst system. The lower section of the reactor forms a mixing space 13 in which the circulating gas flow passing into the reactor via a circulating gas inlet nozzle 14 is distributed into a maximally uniform, upward directed flow. The polymerization space 12 and the mixing space 13 are separated from each other by a gas distribution plate 15, whose function is to promote uniform entry of the circulating gas into the fluidized bed and to prevent the backflow of polymer particles contained in the fluidized bed to the mixing space 13. The distribution plate 15 is provided with uncapped openings.

Gas is continuously removed from the gas space 16 at the upper part of the polymerization space 12 via an outlet line 17. To the outlet line 17 are adapted heat exchanger means 18 for cooling the gas removed from the reactor 10 and a compressor 19 serving to pump the cooled circulating gas back to the lower section 13 of the reactor 10 via a line 20 and a nozzle 14. A flow control element placed above the inlet nozzle 14 of the circulating gas is denoted by a common reference numeral 30. The flow control element 30 can comprise a plate-like surface perforated with a plurality of holes and located such that a major part of the gas flow is directed sideways below said means and a minor part of the gas flow is directed upwards to pass through the holes, as taught in EP 0 684 871 B1 and EP 0 707 513 B1.

Monomers are fed to the circulating gas line 20 via a line 21, while the optional comonomers and hydrogen can be fed via lines 22 and 23. The product is removed from the fluidized-bed reactor 10 via a valve 24 and a line 25. In the case the fluidized-bed reactor is preceded by another polymerization step, the polymer feed taken therefrom can be passed to the fluidized-bed reactor 10 via a line 26.

The polymer outlet can be of a conventional, discontinuously working type, as shown in the drawing, or a continuously operating discharge system of the kind disclosed in the Published International Patent Application No. WO 00/29452.

The distribution plate 4 is generally built up by several segments (or polygons as mentioned above), which are welded together inside the reactor to form a uniform planar plate. It is supported by a grid or similar rigid support means, which are attached to the wall of the reactor. There is one single distribution plate in the reactor.

The reactor body has an essentially circular cross-section transversal to the central axis and the distribution plate has a circular periphery.

FIG. 2 shows in more detail the cross-section of a part of the distribution plate and the adjacent reactor wall. Reference numeral 31 stands for the wall and numeral 32 for the distribution plate. The cross-section is shown through two openings 33 and 34 formed in the plate. The inlet of the openings 33, 34 is conically expanding towards the lower part of the reactor, whereas the upward extending part is cylindrical and uncapped. A part of a steel support structure 35 for the distribution plate 32 is shown in the drawing.

The diameter of the distribution plate is typically at least 1 mm, preferably about 2 to 20 mm, smaller than the inner diameter of the reactor body. As can further be seen, there is then a gap formed between the wall 31 and the edge 36 of the plate since no sealing has been inserted between the edge and the wall. In cross-section, the gap between the edge and the wall is mainly rectilinear. Numeral 37 designates an upward directed flow of gas fed into the lower part of the reactor through the gap and passed the distribution plate 32.

Figure 3:
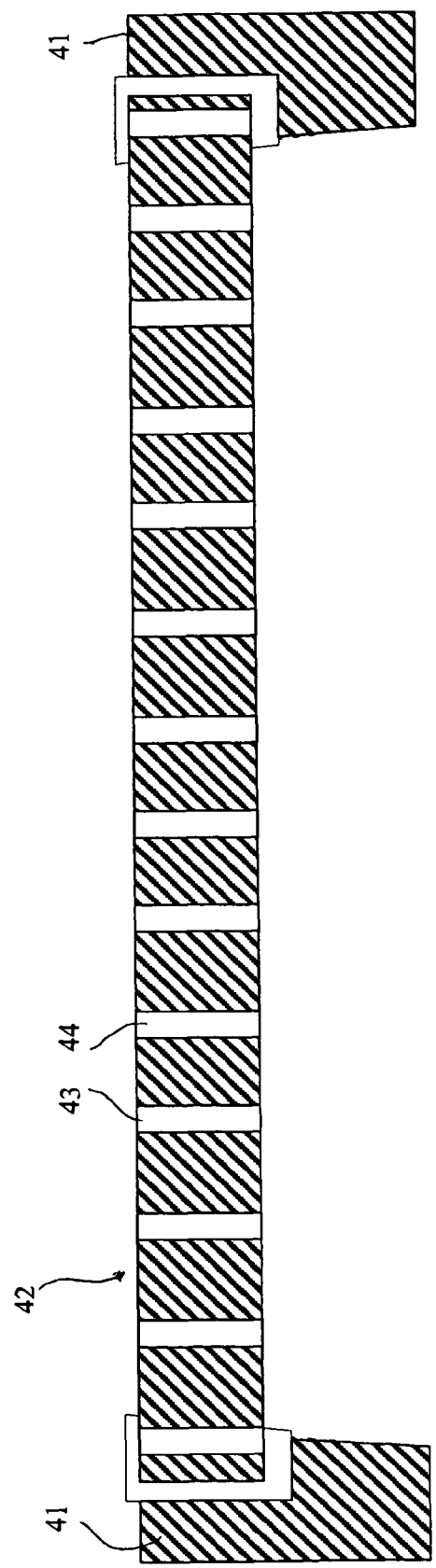
FIG. 3 shows in side view a first construction for supporting the gas distribution plate inside the reactor wall.
Figure 4:
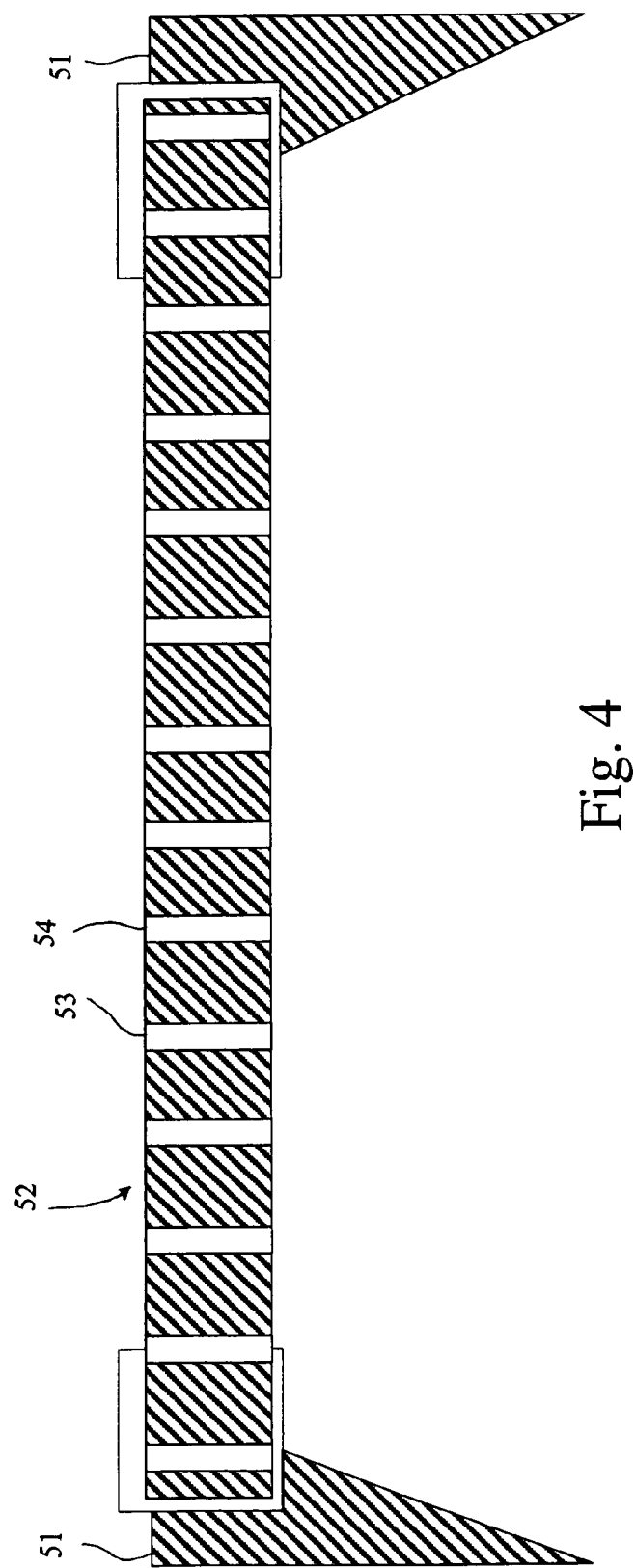
FIG. 4 shows in side view a second construction for supporting the plate inside the reactor wall.

The gas distribution plate can be supported on a number of supporting elements attached to the reactor wall, as shown in FIGS. 3 and 4. In FIGS. 3 and 4, reference numerals 41 and 51, respectively, depicts the supporting means, numerals 42 and 52 stand for the plates and numerals 43, 44 and 53, 54 identify individual openings. The supporting elements are identical and symmetrically displaced along periphery of the plate and inner wall of the reactor.

The number of elements 41 and 51 is sufficient to bear the load of the gas distribution plate. On the other hand, the supporting elements should leave sufficient free space for the gas stream to sweep the reactor wall. While the required space between the supporting elements depends very much on their structure, it has been found that the suitable distance between such supporting elements along the periphery of the gas distribution plate is from 5 to 50 cm, preferably from 5 to 40 cm and in particular from 10 to 40 cm.

Figure 5:
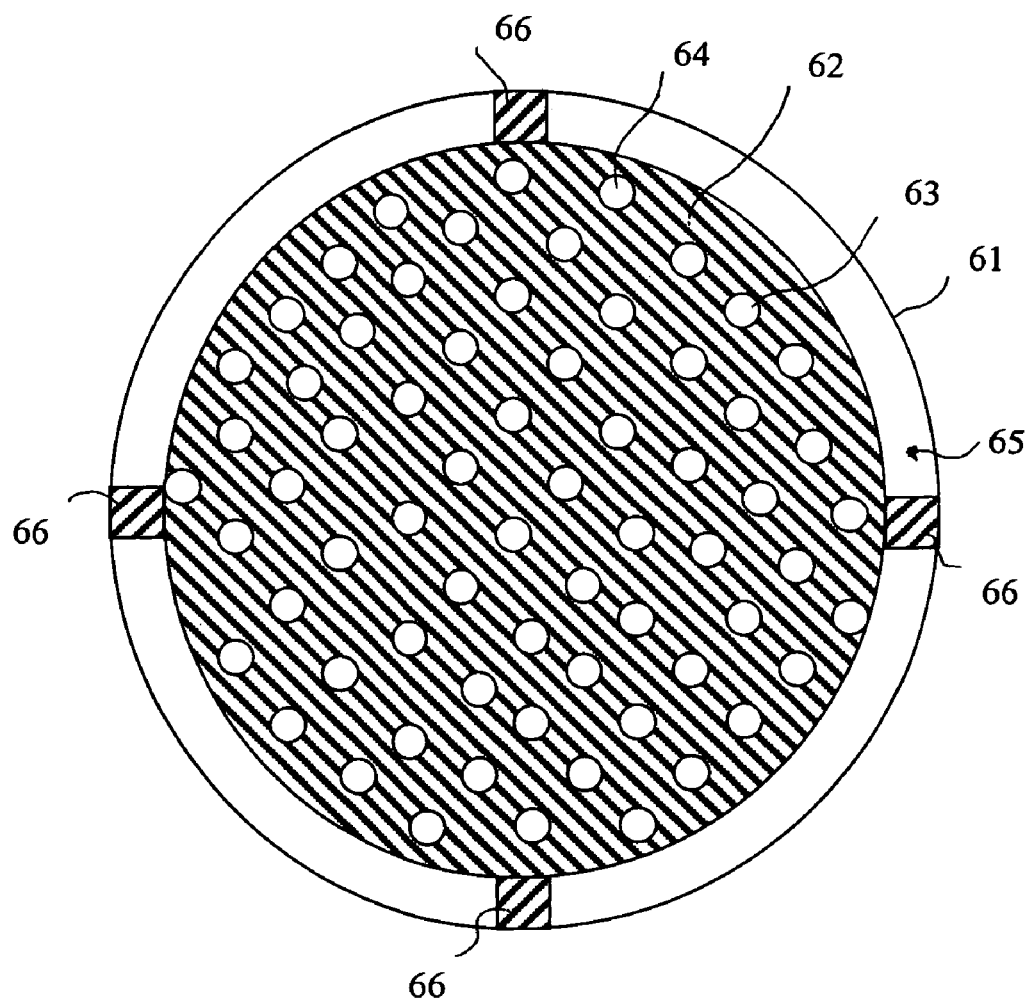
FIG. 5 shows in top view a gas distribution plate fitted inside a polymerisation reactor.

FIG. 5 shows in top-view a distribution plate 62 according to the invention, placed inside a reactor body 61. The openings 63 and 64 in the plate are evenly distributed in the plate. The openings are circular in cross-section. As can be readily seen from FIG. 5, the plate will somewhat restrict the upward directed flow of the gas, forcing the gas to flow either through the openings or through the annular aperture 65 formed between the inner wall of the reactor body and the outer periphery of the plate 62. The supporting means have been given the reference numerals 66.

The area of the annular aperture is at least 5%, preferably at least 10%, advantageously at least 20%, in particular at least 30%, for example at least 40% of the total gas passage area of the distribution plate to allow for a corresponding portion of the gas flow.

EXAMPLE

In practical operation, the present invention was carried out in a gas phase reactor having a cylindrical part containing the fluidised bed and a conical part at the top of the reactor. The height of the cylindrical part was about 2,000 mm and the diameter about 800 mm. The gas distributor plate was located in the cylindrical part at a height of about 500 mm from the bottom of the reactor. It was supported on a steel frame, which was mounted to the wall at three points. The sealing was removed from between the wall of the reactor and the edge of the gas distributor plate, so that a continuous annular opening having a width of about 3 mm was formed between the wall and the edge of the distributor plate. The reactor was equipped with a stirrer similar to what is disclosed in EP-B-707513.

The gas phase reactor was operated at a 20 bar pressure and temperature of 85° C. Into the reactor was continuously introduced polymer powder containing active catalyst from the preceeding loop polymerisation stage. The polymer produced in the loop reactor was a homopolymer of ethylene having a melt index $MFR_2$ (measured according to ISO 1133 at 190° C. and under a 2.16 kg load) of about 300 g/10 min.

Polymerization was continued in the gas phase reactor by feeding additional ethylene, 1-butene comonomer, hydrogen and nitrogen as inert gas into the reactor. The resulting polymer was withdrawn from the reactor intermittently so that the height of the bed was maintained on a constant level. During a period of two months, a number of different products were produced, and consequently different compositions of reactor gas were employed. The recycle gas flow was usually set within the range of 13,000 to 16,000 kg/h. Space time yields of up to 140 kg/h/m$^3$ were employed. No sign of plugging was observed during the two-month period.

The experimental conditions are summarized below:

|  | Run | | |
| --- | --- | --- | --- |
|  | 1 | 2 | 3 |
| Ethylene concentration, mol/kmol | 11 | 6 | 120 |
| Butene/ethylene, mol/kmol | 100 | 50 | 120 |
| Hydrogen/ethylene, mol/kmol | 15 | 10 | 10 |
| Recycle gas flow, kg/h | 15,000 | 13,000 | 14,000 |
| Space time yield, kg/h/m$^3$ | 50 | 60 | 100 |
| MFR$_{21}$, g/10 min | 10 | 8 | 6 |
| Density, kg/m$^3$ | 949 | 953 | 945 |

After the end of the test period, the reaction was stopped and the reactor was drained and opened for inspection. No chunks or polymer agglomerates were found within the reactor, which is an indication that the gas flow between the gas distributor plate and the reactor wall is sufficient to prevent the formation of stagnant zones near the wall. The holes of the gas distributor plates were not plugged. For reference, a significant number of holes of a gas distributor plate having overcaps were plugged after a similar campaign.

The invention claimed is:

1. Method of producing polymers in a gas phase polymerization reactor, the reactor having an elongated reactor body, defined by reactor walls, and an essentially vertically disposed central axis, the reactor comprising an upper part, in which a reactor bed of fluidized catalyst particles can be formed, and a lower part, in which monomer gas can be introduced, said upper and said lower parts being separated by a distribution plate having an annular opening along the reactor walls which promotes distribution into the fluidized bed of monomers flowing from the lower part into the upper part, the annular opening being formed between the periphery of the distribution plate edge and the reactor wall to allow at least 30% of the total flow of the gas stream to flow along the inside of the wall past the distribution plate, wherein said method comprises:
feeding a gas stream containing one or more monomers into the lower part of the reactor;
polymerizing the monomers on the catalyst particles to form a polymer;
withdrawing unreacted monomers; and
recovering the polymer,
wherein the gas stream is fed into the lower part of the reactor along the periphery of the inside of the reactor walls past the abutting distribution plate to prevent the formation of stagnant zones in the fluidized bed at the reactor walls in the vicinity of the distribution plate, and a single distribution plate is used in the reactor body, wherein at least 30% of the total flow of gas through the distribution plate is conducted along the periphery of the inside of the reactor walls.

2. The method according to claim 1, wherein a gas stream is conducted along at least 80% of the periphery of the inside of the reactor walls abutting the distribution plate.

3. The method according to claim 1, wherein a gas stream is conducted along 90-100% of the periphery of the inside of the reactor walls abutting the distribution plate.

4. The method according to claim 1, wherein the annular opening has a width of 2 to 20 mm.

5. The method according to claim 1, wherein the flow rate of the gas stream conducted along the inside of the reactor walls is about 1 to 200 cm/s, preferably 10 to 100 cm/s, in particular 30 to 70 cm/s.

6. The method according to claim 1, wherein the distribution plate has openings, which are not covered by overcaps to allow for free flow of gas through the openings from the lower part of the reactor into the upper part.

7. The method according to claim 1, wherein the openings of the distribution plate are essentially circular in cross-section.

8. The method according to claim 1, wherein the part of the gas stream conducted along the inside reactor walls forms 40%, of the total flow of gas through the plate.

9. The method according to claim 1, wherein the annular opening has a width of 2 to 10 mm.

10. The method according to claim 1, wherein the flow rate of the gas stream conducted along the inside of the reactor walls is about 10 to 100 cm/s.

11. The method according to claim 1, wherein the flow rate of the gas stream conducted along the inside of the reactor walls is about 30 to 70 cm/s.

12. The method according to claim 2, wherein a gas stream is conducted along 90-100% of the periphery of the inside of the reactor walls abutting the distribution plate.

13. Apparatus for producing polymers by gas phase polymerization, comprising:
an elongated reactor body, defined by reactor walls, said reactor body having an essentially vertically disposed central axis, said reactor body comprising an upper part, in which a reactor bed of fluidized catalyst particles can be formed, and a lower part, in which monomer gas can be introduced, said upper and said lower parts being separated by a distribution plate which promotes distribution into the fluidized bed of monomers flowing from the lower part into the upper part;
at least one feed nozzle in the lower part of the reactor for introducing a gas stream containing monomers into the lower part of the reactor;
an outlet nozzle in the upper part of the reactor for recovering unreacted monomers; and
a discharge device in the upper part of the reactor for recovering polymer product from the reactor, wherein the distribution plate is fitted inside the reactor body in such a way that an essentially annular opening is formed between the periphery of the plate edge and the reactor wall to allow for the flow of at least 30% of the total flow of gas stream fed into the lower part of the reactor along the inside of the reactor walls past the distribution plate, and wherein a single distribution plate is fitted inside the reactor body.

14. The apparatus according to claim 13, wherein the reactor body has a circular cross-section transversal to the central axis and the distribution plate has a circular periphery, the diameter of the distribution plate being 2 to 20 mm smaller than the inner diameter of the reactor body.

15. The apparatus according to claim 13, wherein the distribution plate has openings that have a circular cross-section transversally to the central axis of the reactor.

16. The apparatus according to claim 14, wherein the distribution plate has openings that have a circular cross-section transversally to the central axis of the reactor.

* * * * *